350-279.

10-12-71    OR    3,612,666    SR

[11] 3,612,666

[72] Inventor   Jacob Rabinow
                Bethesda, Md.
[21] Appl. No.  54,474
[22] Filed      July 13, 1970
[45] Patented   Oct. 12, 1971
[73] Assignee   Max L. Libman
                Reston, Va.
                a part interest

[54] ELECTRICALLY CONTROLLED REARVIEW
     MIRROR EMPLOYING SELF-CONTAINED POWER
     SUPPLY AND MOTION-ACTUATED POWER
     SWITCH
     8 Claims, 6 Drawing Figs.

[52] U.S. Cl......................................... 350/279,
        250/206, 315/77, 350/289, 350/295, G02b/17/00
[51] Int. Cl......................................... G02b 5/08,
                                                      G02b 5/10

[50] Field of Search............................ 350/279,
                            289, 295; 250/201, 206; 315/77, 82

[56]              References Cited
              UNITED STATES PATENTS
     3,510,205   5/1970   Schiffman ................   350/279

Primary Examiner—James W. Lawrence
Assistant Examiner—T. N. Grigsby
Attorney—Max L. Libman ABSTRACT: Photoelectrically controlled rearview mirrors for automobiles are old in the art and have been energized by the electrical system of the automobile. In order to eliminate wires, a rearview mirror is operated by its own small batteries and the circuit is arranged to have a very small standby current. In order to eliminate manual switching in one embodiment a trembler switch is employed. This switch operates whenever the car is in motion.

PATENTED OCT 12 1971     3,612,666
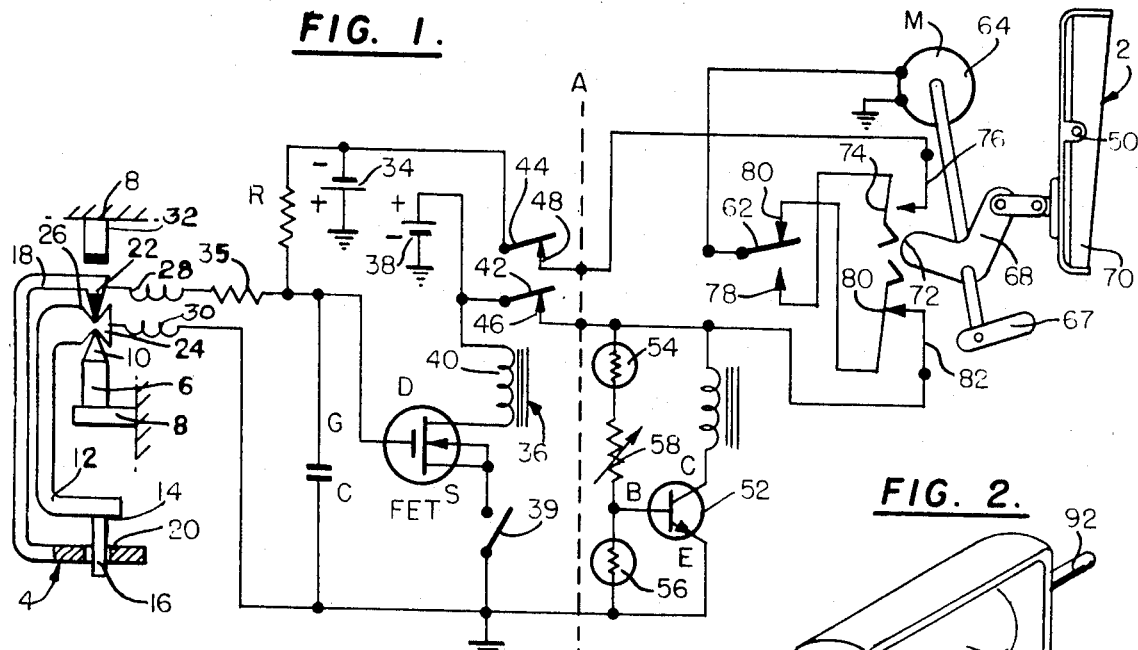
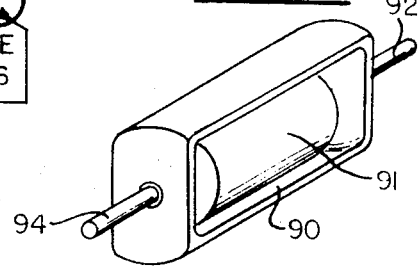
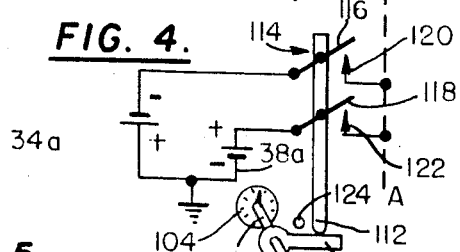
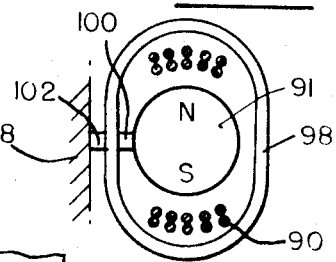
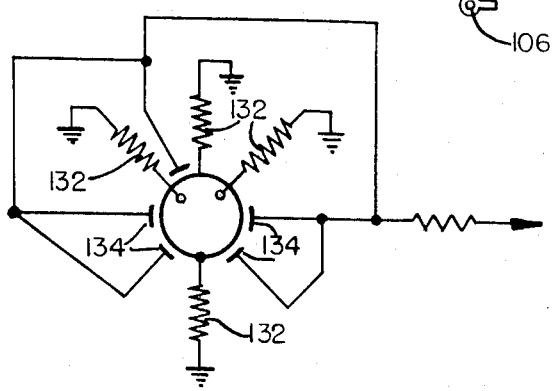
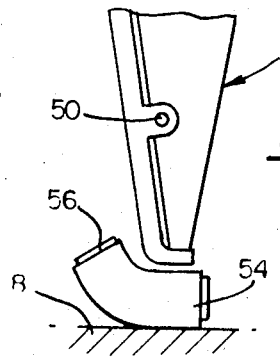
INVENTOR
Jacob Rabinow
BY Max L. Libman
ATTORNEY

3,612,666

ELECTRICALLY CONTROLLED REARVIEW MIRROR EMPLOYING SELF-CONTAINED POWER SUPPLY AND MOTION-ACTUATED POWER SWITCH

DESCRIPTION OF THE INVENTION

Rearview mirrors that provide a bright and dim reflection of the field of view to the rear of a car are old in the art. Also old in the art are controls that operate by a photoelectric cell to provide automatic control of the mirror when a predetermined amount of light falls upon it. U.S. Pat. illustrative of this old art are, for example, Nos. 3,000,262 and 3,307,899. In prior art, the power to operate the mechanism of such dimmers has come from the power supply of the automobile. This is difficult to do in modern cars because a lead has to be brought up from the car's power supply to the mirror mounting. Since such mirrors are likely to be optional with the purchaser of a car, the wire would have to be installed either at the time the car is purchased or to be provided in all cars whether the mirror is used or not. My invention contemplates the use of local batteries and a circuit so arranged that the standby power when the mirror is not used is extremely small, and even when the mirror is in operation the power drain is kept very small except for the very brief time when the mirror is in transit from its "bright" to "dim" condition or from the "dim" to "bright" condition.

In one embodiment, in order to avoid the necessity of switching of the circuit to the "on" condition when driving with the attendant chance that the circuit will be left on after the car is stopped, that is, is no longer being driven, I have provided an automatic means to put the dimmer into operation. This consists essentially of a "trembler" switch which operates whenever the car is in motion. The trembler switch is gravity oriented so that the steady-state angle at which the car and/or the mirror find themselves at any time is of no consequence. Only accelerations in the horizontal plane operate this switch. A long time-constant circuit is connected to this switch so that even if the switch operates only occasionally the circuit will be on continuously, as will be explained below. The use of modern transistors such as the field-effect transistor enables one to develop circuits which require extremely small standby power, comparable to, or less than the normal leakage current of a battery, and which enable one to develop long time-constants in a control circuit so that even if the trembler switch makes one contact as rarely as once a minute, the circuit will remain closed and the mirror will continue to operate normally.

The specific nature of my invention, as well as other objects and advantages thereof, will clearly appear from a description of a preferred embodiment as shown in the accompanying drawing in which:

FIG. 1 shows a schematic diagram of one embodiment of the invention;

FIG. 2 shows a detail of a galvanometer construction which may be used to actuate the mirror;

FIG. 3 shows another view of the same galvanometer;

FIG. 4 shows a partial circuit of another embodiment of my invention;

FIG. 5 shows a variation of a trembler switch; and

FIG. 6 shows the arrangement of photocells with respect to the mirror.

DETAILED DESCRIPTION OF THE INVENTION

The portion of the circuit of FIG. 1 to the right of line A—A is the control of the mirror 2, whereas the left portion of the circuit, employing the field-effect transistor marked FET, is the standby control which is operated by the trembler switch 4.

The trembler switch 4 consists essentially of three main parts: the support 6 mounted on the frame 8 of the mirror assembly, on the point 10 of which is pivoted a generally C-shape weight 12. To the bottom surface 14 of this weight 12 there is mounted a pin 16. Pivoted above this member 12 is another C-shaped member 18, larger than the first, which has a hole 20 through which the pin 16 passes. The suspension is designed to be such that both pivots 10 and 22 are as close together as possible. I would like them to be at one point, but since this cannot be done easily, I show two conical depressions 24 and 26 in member 12, the bottom depression 24 resting on the fixed pin 10, while in the upper depression 26 rests the insulated pin 22 of the member 18. The distance between the two pins 6 and 22 can be made quite small so that, for all practical purposes, the two weights 12 and 18 can be considered as pivoted essentially at a common point.

Connected to the weights 12 and 18 are two small pigtail wires 28 and 30 which serve a double purpose: one is to connect the electrical circuit to the two members 12 and 18, and the second purpose is to provide a gentle restoring force to the two members so that they do not rotate about their pivots, that is, they do not rotate so as to hit the support 6 and the frame 8.

Since the car in which the pendulous weights 12 and 18 are mounted can experience violent jolts due to imperfections in the road surface, an insulating stop member 32 mounted on the mirror frame 8 is shown just above the upper C-shaped member 18. This member 32 is mounted close enough so that the two pin bearings 24 and 26 cannot separate from each other.

The members 12 and 18 are so proportioned that, when undisturbed, they hang in the configuration as shown in FIG. 1 and the pin 16 does not touch the sides of the hole 20 in member 18. If the car moves, however, and experiences any acceleration either longitudinally or sideways, the two members 12 and 18 will swing and because they have different periods of oscillation, the pin 16 will come in contact with the sides of the opening 20 and close the circuit between the two pigtail wires 28 and 30.

The field-effect transistor, FET, shown, is of the NPN depletion type such as, for example, RCA No. 3N138 or similar. This type of transistor requires negligible current for control, which can be applied to the gate electrode G is FIG. 1. The transistor current from source S to drain D, is controlled by the voltage on the gate G as is well understood in the art. A battery 34 is shown connected between the "ground" or frame of the mirror assembly and a large resistor R. This resistor is connected to a large capacitor C which is connected as shown in the diagram from gate G to ground.

In the normal undisturbed condition, the trembler switch 4 is not closed and condenser C charges to full negative potential through the resistor R. This serves to cut off the FET transistor so that no current flows through the relay 36 connected to its drain circuit.

A small resistor 35 is connected in series with the trembler switch 4 so that when the trembler switch contacts during the motion of the car, the discharge current from the capacitor C is limited by this resistor 38 and is kept from damaging the contacts 16 and 20 of the trembler switch 4. The resistor 38, however, must be small enough so that the capacitor C discharges rapidly when the contacts 16 and 20 of the trembler switch 4 touch.

A battery 38 with the opposite polarity is also shown in FIG. 1 and provides the power to the FET transistor and relay 36 circuit when the trembler switch 4 closes. In motion, the trembler switch 4 closes, discharging the capacitor C, thus reducing the FET gate voltage to near zero. This produces a current flow in the source-to-drain circuit of the FRT and through the coil 40 of relay 36. The relay 36 is provided with two contacts 42 and 44 which are normally open as shown in FIG. 1. When the FET transistor is energized, these two contacts 42 and 44 pull down and touch contacts 46 and 48 providing a negative and positive voltage to the mirror circuit as can be seen in FIG. 1, that is contact 48 gets a negative voltage from battery 34, while contact 46 gets a positive voltage from battery 38.

The relay 36 is of the low-current type requiring current of the order of 1 to 5 mils so that the drain on the battery 38 is quite small and occurs only when the car is in motion.

The operation of the whole mirror mechanism will now be explained. The mirror 2 can be of the usual beveled glass type which provides two images and has to be tilted about its horizontal axis 50 so that the driver sees one or the other of the images. In order to operate this mirror, I use a transistor 52 as shown in the diagram. Two photoelectric cells 54 and 56 are mounted on the mirror frame. Photoelectric cell 56 is mounted to the side or below the mirror 2 in such a way as to receive light from behind the car, that is, through the back window of the automobile if it is of the usual closed type, as shown for example in FIG. 6. The photoelectric cell 56 is mounted in front of mirror 2, that is, facing the windshield and preferably pointed at the sky. The purpose of this will be explained below. In series with the upper photocell 54 is a variable resistance 58 which can be set manually to control the sensitive of the system.

Assume now that the car is in motion and that the trembler switch 4 has made several contacts, thus discharging capacitor C. The capacitor C charges very slowly through the resistor R so that the FET transistor is energized and the relay 36 pulls both contacts 42 and 44 down. The positive voltage of battery 38 is therefore applied to the photocell circuit. If the car is driven at night, the photocell 56 sees a dark sky and its resistance is very high and it can be seen then that the base B of the transistor 52 is not connected to ground through this photocell 56. When light from behind the car impinges on photocell 54, its resistance drops and it applies a positive voltage to the base of transistor 52 and causes current to flow in this transistor. This means that an amplified current flows through relay 60 and the collector circuit of transistor 52. This current operates relay 60, pulling down contact 62 and applying a negative voltage to the motor 64 through contact 78. When this voltage is applied, the motor 64 turns clockwise, pushing the bottom 70 of the mirror 2 to the right. When the motion has gone through approximately 30°, as shown in FIG. 1, the end 72 of bellcranck member 68 (which can be made of suitable insulating material, such as Nylon) contacts switch element 74 opening contact 76 and breaking the circuit of the motor 64. The motor 64 then remains in this position until the next event.

It will be noted, therefore, that the more or less large current required for driving the motor 64 is only drawn long enough for the mirror 2 to change position. As long as the lights from the following car remain on, photocell 54 and the relay 60 remain energized and the contacts 62, 78 remain closed, the mirror 2 stays in the counter clockwise position where the contacts 74,76 are open. If the following car passes the auto with my mirror, or turns off, light no longer falls on photocell 54, the resistance of the photocell 54 rises, the current through the base of transistor 52 drops to a small value, the transistor 54 no longer sends current through the relay 60. The relay 60 is deenergized, and the contact 62 springs back into its upper position as shown in FIG. 1. Since contacts 80 and 82 are closed (as shown in FIG. 1) the motor 64 circuit is connected to the positive polarity of battery 38 (relative to ground). It runs in the opposite direction, that is, counterclockwise, moves the bottom 70 of the mirror 2 to the left and opens the contacts 80 and 82. The motor 64 again stops because its circuit is now broken and remain s in this position as long as no light (or little light) falls on photocell 54. Again it can be seen that the current through the motor 64 flows only during the transition of the mirror 2.

The relay 60 is also of the low current type, taking only one or more milleamperes so that the currents drawn by the relays 36 and 60 are very small and the larger motor current, which may be a large fraction of an ampere, is only drawn by the mechanism while moving the mirror 2 from one to the other position. It should also be noted that the 2 cannot remain in its neutral position because in that position both contacts and 74, 76 and 80, 82 are closed so that the motor will move in one direction or the the other depending upon whether relay contact 62 is in the downward or the upward position.

The motor 64 can be of the standard iron rotor type or it can be of the galvonometer type manufactured by several companies which produce motors of high efficiency and low current. Such a motor, for example, is manufactured by the Portescap Corporation in Switzerland. It has an armature which consists only of copper wire, with all the magnetic material standing still. Such motors are provided with gear boxes so that the torque output can be as large as necessary for an operation such as moving the mirror.

Since the motion of the mirror 2 requires a rotation of shaft 66 of only a small fraction of a full circle, an actual galvanometer coil can be employed and I show such a design in FIG. 2. The external iron or steel case around the coil is not shown in FIG. 2 but is shown in FIG. 3. The galvanometer coil 91 is a conventional long coil to which are cemented two pivots 92 and 94 which act as bearings. The rest of the details, such as the fixed bearings mounted on the frame of the mirror are not shown for clarity. The cross section of such a galvanometer 90 can be seen in FIG. 3 where the inner magnet 96 is magnetized as shown, that is perpendicularly to its axis. The coil 90 is located as shown in both FIGS. 2 and 3 and the outside of the whole assembly has a ferrous tube 98 to close the magnetic circuit. The inner magnet 96 and magnetic tube 98 are mounted by suitable spacers 100 and 102 to the frame 8 of the mirror assembly.

It will be seen from the above description that when the car is parked, the trembler switch 4 is open, the capacitor C stays charged to the full negative voltage of battery 34, the FET is but off, and no current flows in relay 36. Its contacts 42 and 44 are therefore open and no current is applied to the operating circuitry of the mirror. The current taken by the gate of the FET is negligible.

When the car is driven, the trembler switch 4 periodically makes contacts 16 and 20, the capacitor C is kept discharged, the FET draws current from battery 38. This current can be quite small, such as 1 or 2 milleamperes, depending on the design of the relay 36. The current through transistor 52 depends only on the amount of light falling on the photocells 64 and 56 so that its action is intermittent and the current again can be kept down to about one milleampere. If the photocell 56 is pointed to a light sky, as in daytime, the transistor 52 is kept cut off and no current flows through relay 60.

Batteries having long shelf life and very compact design are now available in a large variety of types and they can be easily inserted into suitable holders. The widespread use of flashlights, transistor radios, hearing aids, and other battery-operated devices makes it possible at the present time to obtain these batteries in a wide variety of stores and their use presents no problems to the average owner or driver of an automobile.

A manual switch 39 is shown in FIG. 1, so that the circuit can be disabled, if desired, by opening this switch. This may be necessary, for example, when the batteries are weak or if for any other reason manual operation of the mirror 2 is desired. The shaft 66 can be provided with a handle 67 which can be turned by hand so as to tilt the mirror 2 as desired under such condition. It is expected however that with the circuit working properly the switch 39 and the manual handle 67 will not be employed.

While I show the use of two conventional transistors FET and 52 and two sensitive relays 36 and 60 in the circuit, it is obvious that other types of transistors and other equivalent circuitry can be employed. For example, the use of other field effect transistors or different transistors would require batteries of other polarities and different voltages. There is also a great variety of photocells available. Instead of the second relay 60, for example, the invention can use transistor circuitry to close and open motor current circuits, but for simplicity, clarity and convenience in explaining how the invention works, I believe the circuit of FIG. 1 is quite suitable.

While I show completely automatic means of initiating the action of the rearview mirror when the car is in motion, it is also possible to use a manual means to initiate the action, but with most of the circuitry remaining the same so that the current taken through the batteries still remains small. That is, the power taken to move the mirror 2 is used only during the transition from dark to light and the power required to operate the photocell control remains very small. In order to accomplish this without the use of the pendulous device 4 and the first transistor (the FET), I show the circuit of FIG. 4 which is identical to the right of line A—A of FIG. 1, but different to the left of line A—A.

In FIG. 4 I show a conventional mechanical timer 104 which can be wound and started by turning knob 106 clockwise. This winds the timer 104 and starts its action so that the shaft 108 to which knob 106 is attached moves counterclockwise back to its initial position after being released. Such timers are widely used today for controlling all sorts of devices from baking ovens to photographic timers and are too well known to require detailed explanation. Mounted on the shaft 108 is a pawl 110 which moves an insulating arm 112 that operates a double-pole, single-throw switch 114. This switch replaces the two contacts 42 and 44 in FIG. 1. The batteries 34a and 38a are connected to the two contacts 116 and 118 of the switch 114 just as they were connected to the two relay contacts 42 and 44 in FIG. 1. The rest of the circuit to the right of contacts 120 and 122 is identical with that of FIG. 1.

In order to operate this version of my invention, the driver who wants his mirror to operate automatically would move the knob 106 clockwise approximately a desired amount. For example, a full turn could be equivalent to 12 hours. A fraction of that could be used for 1 hour, 2 hours, or whatever the length of time the driver expects to be in his car that evening. The timing does not have to be accurate, winding the timer 104 too far would have no ill effects except a very slight additional drain on the batteries 34a and 38a.

If the driver forgets to move the knob 106 when he starts the trip, the mirror 2 would not operate and the driver would soon note this condition and would turn the knob 106 to the right. The action from then on would be automatic as described before. The reason for the use of the timer in my invention is so that when the driver finally finishes his trip, he would not have to remember to shut off the mirror. The clock 104 would continue running and the shaft 108 would revolve counterclockwise until pawl 110 opens the contacts 116, 120 and 118, 122 and comes in contact with stop 124. A 12-hour timer should be sufficient for all normal conditions, but this would be a matter of choice. The advantages of this particular embodiment over that of FIG. 1 is that it is simpler and there would be no battery drain at all until the knob 106 was turned, because the batteries 34a and 38a would be completely disconnected from the circuit.

It is also obvious that instead of the mirror 2 being wedge-ground to show two views, dim and bright, other forms of dimming mirrors such as those using shutters, or variable density filters such as shown in U.S. Pat. No. 3,000,262 cited above, and other expedients to dim the light can, of course, be employed.

While I have described a trembler switch that uses two pendulous members, many other acceleration sensing switches are available. One such is shown schematically in FIG. 5. A metal ball 130 is suspended by four springs 132. Surrounding this ball 130 are a set of contacts 134 arranged so as not to touch the ball 130 when the car is standing still. When the car is subject to the usual random accelerations in motion, the ball 130 oscillates and periodically comes in contact with one or more of the contacts 134. It should be understood that the contacts 134 are located so as to face the ball 130 from all direction and not only from the sides, as shown in FIG. 5 for clarity. Trembler switches of this general type are well know in the field of ordnance and in alarm systems.

I claim:

1. a. A self-contained automatically dimming rearview mirror for automotive vehicles, said mirror being provided with antiglare means movable into at least two alternative positions corresponding to different glare conditions in the rearward field of view of the mirror, comprising b. motor means to move said antiglare means from one position to another,
   c. electric circuit means including photoelectric control means responsive to light from said rearward field of view to energize said motor means to provide a dim rear view when said light exceeds a predetermined value, and vice versa, and
   d. a self-contained power supply mounted in or near the mirror to energize said motor control and photoelectric means, said power supply being normally in the off condition when the vehicle is motionless, and
   e. switch means responsive to a change of motion of the vehicle for actuating said power supply means to the on condition.

2. The invention according to claim 1, said switch means being responsive to continued change of motion of the vehicle to maintain said on condition as long as such change of motion persists.

3. The invention according to claim 1, said control means comprising electric circuit means including a field effect transistor having a very high input impedance, which transistor is kept in nonconducting condition so as not to actuate the electrical circuit of the mirror when the car is not in motion, and means to detect a change of motion of the car to control this transistor to operate and provide current to the rest of the circuitry when the car is in motion.

4. The invention according to claim 3, said motion detecting means consisting of two pendulous members arranged to have a substantially common pivot point and arranged to hang in such a way that they do not contact each other when the mounting is standing still and to contact each other periodically to energize said motor control circuit when the mounting experiences accelerations in a predetermined plane.

5. The invention according to claim 1, said switch means consisting of two pendulums coaxially mounted, each having a contacting member adjacent the other contacting member so arranged that they do not contact when the switch is not disturbed, such contacting members touching each other, when accelerations at an angle to this axis are experienced, to actuate the mirror control circuits.

6. The invention according to claim 5, said electric circuit means having long RC time constants to keep the circuits energized during the intervals between contacts of the pendulous switch while it is operating intermittently due to motion of the vehicle.

7. a. A self-contained automatically dimming rearview mirror for automotive vehicles, said mirror being provided with antiglare means movable into at least two alternative positions corresponding to different glare conditions in the rearward field of view of the mirror, comprising b. motor means to move said antiglare means from one position to another,
   c. electric circuit means including photoelectric control means responsive to light from said rearward field of view to energize said motor means to provide a dim rear view when said light exceeds a predetermined value, and vice versa, and
   d. a self-contained power supply mounted in or near the mirror to energize said motor control and photoelectric means, said power supply being normally in the on condition when said mirror is in use, and said power supply being connected to the said motor means only when said motor means is moving the antiglare means from one position to another.

8. The invention according to claim 7, including a timer arranged to connect said power supply to the mirror controlling means, said timer being operable for a preset time so that at the end of said time the power will be disconnected from the automatic circuit of the mirror.